No. 658,240. Patented Sept. 18, 1900.
W. H. COOK.
CENTRIFUGAL MACHINE.
(Application filed May 23, 1900.)
(No Model.)
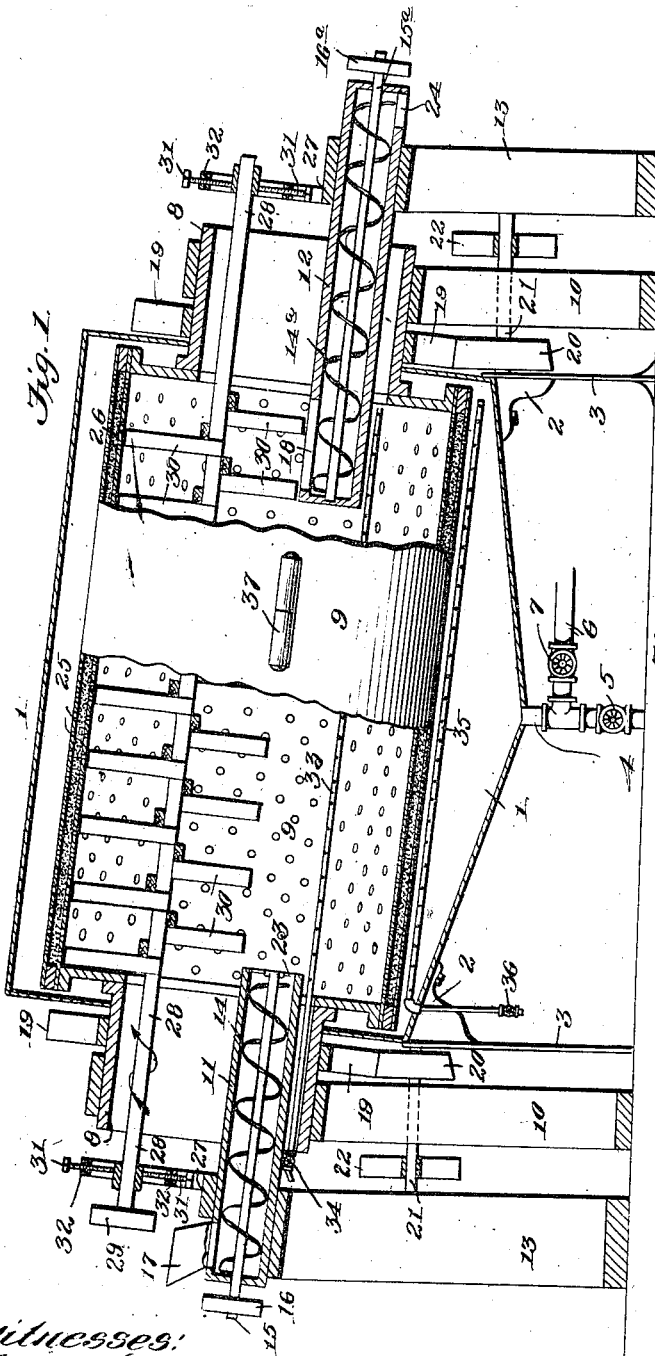

UNITED STATES PATENT OFFICE.

WALTER H. COOK, OF NEW ORLEANS, LOUISIANA.

CENTRIFUGAL MACHINE.

SPECIFICATION forming part of Letters Patent No. 658,240, dated September 18, 1900.

Application filed May 23, 1900. Serial No. 17,898. (No model.)

*To all whom it may concern:*

Be it known that I, WALTER H. COOK, a citizen of the United States, residing at New Orleans, in the parish of Orleans and State of Louisiana, have invented new and useful Improvements in Centrifugal Separators, of which the following is a specification.

This invention relates to centrifugal separators for eliminating one or more of the constituents of fluids or other substances.

It is one of the purposes of my invention to provide a centrifugal separator that shall be capable of treating fluids as well as substances which are not fluid, but which have been either naturally or artificially brought into a condition suitable for treatment by granulation, pulverization, or other preparatory treatment.

It is my purpose also to provide improved means for automatically feeding non-liquid substances into the separator, for accurately controlling the rate of feed, for regulating the passage of material through the separator, and for making the volume and movement of the material substantially uniform at all points in the separator.

It is a further purpose of my invention to provide a centrifugal separator with simple means for removing deposits or accumulations of separated material from its interior, this feature of my invention being capable of giving a forward movement to the material treated and adapted by a simple adjustment to permit the deposit of filter material on the inner surface of the rotating member of the apparatus and of maintaining such deposit at a predetermined uniform thickness as long as its utilization as a filtering medium is required.

It is also my object to provide simple and thoroughly-efficient means whereby the separator may be quickly and properly cleansed without arresting its operation.

The invention also comprises other useful and novel features, as hereinafter described and then pointed out in the claims.

In the annexed drawings, Figure 1 is a central vertically-longitudinal section of a centrifugal separator constructed in accordance with my invention. Fig. 2 is a view of a ribbon scraper in spiral form. Fig. 3 shows a form of spiral brush that is adapted to serve as a scraper and which will keep the filtering-surface clean. Fig. 4 is an end view of a rotary scraper for regulating the deposit of material upon the interior of the rotary member of the centrifugal apparatus.

Referring to Fig. 1 of the drawings, the reference-numeral 1 designates a stationary casing that is supported by brackets 2 on standards 3, of any suitable form. This stationary casing 1 may be approximately cylindrical in form, but is constructed with a depressed bottom portion that is inclined from both ends toward its center, where it connects with a pipe 4, having a hand-valve 5 therein. The pipe 4 is provided between the valve 5 and the bottom of said casing with a lateral branch pipe 6, having a hand-valve 7, as shown. The ends of the stationary casing 1 are provided with suitable centrally-arranged openings for the passage outward of tubular trunnions 8, that are fixed to or formed on the ends of a rotary and perforated drum or cylinder 9, which is inclosed within the stationary casing. These tubular trunnions 8 are supported in suitable bearings on standards 10, one at each end of the machine.

There is extended through each tubular trunnion 8 a cylindrical conveyer-casing 11 and 12, respectively, and these conveyer-casings are supported by uprights or standards 13 beyond the standards 10, that support the trunnions of a rotary drum or cylinder.

In the cylindrical conveyer-casing 11 there is mounted a spiral conveyer 14, Fig. 1, having its shaft 15 extended at one end and provided with a pulley 16 for actuating said conveyer. The conveyer-casing 11 is provided at its outer end with a hopper or feed-inlet 17 for the introduction of solid material into the separator by the operation of said conveyer.

The cylindrical conveyer-casing 12 has its inner end extended into the rotary drum or cylinder 9 to a farther extent than the inner end of the other conveyer-casing. This conveyer-casing 12 is provided on the upper side of its inner end with an opening 18 for the passage of material from the interior of the rotary drum or cylinder 9 to be received by a spiral conveyer 14ᵃ, having a shaft 15ᵃ and driving-pulley 16ᵃ of the same character as already described with reference to the inlet-conveyer.

For the purpose of rotating the separator drum or cylinder 9 each of its tubular trunnions 8 is provided with a friction-disk 19, and these friction-disks are in contact, respectively, with smaller friction-disks 20, carried on shafts 21, having driving-pulleys 22 thereon. The shafts 21 of the friction-disks 20 may be mounted in suitable bearings provided in the standards 3, 10, and 13.

The material that is fed to the inlet-conveyer 14 through the feed-opening 17 will pass into the rotary drum 9 through the inner end of the inlet conveyer-casing 11, this inner end of the casing 11 being left open except for the web or spider frame 23, that supports the inner end of the conveyer-shaft. The solid material that is discharged from the rotary drum or cylinder 9 passes thence through the opening 18 into the outlet-conveyer 12 to the conveyer 14ª therein and finds an exit through a discharge-opening 24 at the outer end of this conveyer-casing.

The rotary drum or cylinder 9 has its cylindrical walls preferably of double thickness, somewhat spaced apart, and each wall is provided with a series of perforations 25 for the passage of liquid from the interior of the rotary drum or cylinder. If desired, any suitable filtering material 26 may be placed between the two perforated and concentrically-arranged walls of the rotary drum or cylinder.

On the standards 13 there are erected uprights or vertically-extended bearing-arms 27 to provide bearings for a rotary shaft 28, that is extended through the rotary drum 9 and its tubular trunnions. A pulley 29 on one end of the shaft 28 provides means for the rotation of said shaft. This rotary shaft 28 is provided at suitable intervals with radially-arranged scraper-blades 30, Figs. 1 and 2, that preferably alternate with each other, as shown. The bearings in which the end portions of the rotary scraper-shaft 28 are supported may be made vertically adjustable by means of screws 31, through which said shaft may be raised or lowered to adjust the ends of the scraper-blades 30 toward and from the interior wall of the rotary separator-drum. When the rotary scraper has been properly adjusted, it may be secured in the desired position by means of lock-nuts 32 or other suitable means.

As shown in Fig. 1, the rotary separator-drum 9 and its tubular trunnions 8, together with the cylindrical conveyer-casings 11 and 12, are preferably arranged in longitudinally-inclined position. The shaft 28 of the rotary scraper also has a similar inclination. By this arrangement the solid particles that are separated from the material under treatment and which are deposited on the interior of the cylindrical and perforated walls of the drum will be gradually worked forward from the inlet end of the drum to its outlet end and at the same time this layer of material will be deposited uniformly and to a regulated thickness, according to the adjustment that is given to the rotary scraper in its position with relation to the perforated walls of the drum. It will be obvious that owing to the inclined position of the rotary drum 9 any material that is scraped from the uppermost portion of its perforated wall will drop upon the lower portion of said wall at an advanced point and so on as the drum and the scraper are rotated independently of each other. In this way the deposit of separated material will become uniform throughout the interior of the drum and the thickness of this deposit may be readily regulated by adjusting the scraper mechanism upward or downward, as may be required.

There are some waters which contain undesirable material, and this material when separated often forms an excellent filtering medium. In treating such waters the rotary scraper can be so adjusted as to allow a suitable deposit of the separated material to form on the interior of the drum 9, the further increase of the deposit being prevented and its thickness being kept substantially uniform by the action of the scraper mechanism. The filter-water will pass off by centrifugal action through the said deposit and also through the perforations of the drum, and will thus enter the stationary casing 1, whence it may be drawn off in a clear condition through either of the valved pipes 4 or 6.

Another mode of employing the apparatus for the filtering of water is as follows: By feeding into the inlet-conveyer casing 11 a quantity of finely-ground filter-stone or any suitable filtering medium in a fine granular condition this filtering medium will be distributed by centrifugal action and by aid of the rotary scraper evenly over the inner surface of the rotary drum. It can be known when a sufficient quantity of this filtering material has been fed to the filter by the fact of the said filtering medium commencing to discharge itself at the discharge end of the apparatus. When there is a sufficient quantity in the apparatus, then the water can be turned on, the said filtering material being held in its position by the centrifugal action of the machine, and the water to be filtered being also acted upon centrifugally will be thereby forced through the filtering medium and through the perforated walls of the drum, and will thus enter the stationary outer casing. At the same time all foreign accumulations are worked off and out of the apparatus through the outlet-conveyer mechanism.

When the apparatus is employed for filtering water, the inlet-conveyer may be dispensed with, or be left inactive, as the water will readily flow through the conveyer-casing 11 by gravity.

In separating liquids from solids the material to be treated will be fed through the inlet-conveyer 14 and into the rotary separator-drum. On rotation of the drum the material contained therein is thrown by centrifugal action against the perforated cylindrical walls, and the liquid filters through these walls and through the filtering medium attached thereto and enters the outer stationary casing 1, whence it may be drawn off. The solid materials that are left in the drum gradually work out through the outlet-conveyer.

When it is desired to cleanse the apparatus, a suitable cleansing medium—such as steam, hot water, or compressed air—may be introduced into the interior of the rotary drum 9 by means of a perforated pipe 33, Fig. 1, that is extended into said drum from one end thereof to very near its other end. A valve 34 is provided on the pipe 33 to control the flow of the cleansing medium into the drum. In like manner a cleansing medium—such as steam, compressed air, or hot water—may be introduced into the stationary outer casing 1 by means of a perforated pipe 35, that is inserted into one end of said casing and extends therein along and closely adjacent to the under side of the rotary drum. This pipe 35 is also provided with a hand-valve 36 for controlling the inlet of cleansing fluid. By means of the perforated pipe 33 the interior of the rotary drum 9 may be throughly cleansed without stopping the operation of the apparatus and at the same time the perforated pipe 35 provides a ready means for cleansing the interior of the rotary drum and the interior of the outer stationary casing without stopping the apparatus. To further facilitate the cleansing of the apparatus and other purposes, the rotary drum may be constructed in two longitudinal halves or parts, connected to each other by a hinge, as 37, Fig. 1.

In place of the rotary scraper 30 I can use a rotary ribbon scraper 38, Fig. 2, or I may employ a spiral scraper 39, Fig. 3, constructed in the form of a brush that will also serve to keep clean the filtering-surfaces of the rotary casings.

From the foregoing description the operation and advantages of my improved centrifugal separator will be readily understood.

What I claim as my invention is—

1. In a centrifugal separator, the combination of an outer stationary casing, an inner perforated and rotary drum provided with tubular trunnions, cylindrical conveyer-casings extended through and supported independently of said trunnions, spiral conveyers arranged in said conveyer-casings, one of said conveyers being adapted to feed material into the rotary drum and the other to discharge material therefrom, and a rotary scraper located in the upper portion of said drum and having its shaft extended through the tubular trunnions, substantially as described.

2. In a centrifugal separator, the combination of an outer stationary casing, an inner rotary drum having perforated cylindrical walls and provided with tubular trunnions, cylindrical conveyer-casings extended through said trunnions and supported independently thereof, spiral conveyers arranged in said conveyer-casings, a rotary scraper comprising a shaft provided with radially-arranged scraper-blades, and means for supporting the shaft of said rotary scraper and for adjusting it to and from the interior wall of the rotary drum, substantially as described.

3. In a centrifugal separator, the combination of an outer stationary casing, a valved pipe communicating with the lower part of said casing, a rotary perforated drum arranged within the casing and provided with tubular trunnions, cylindrical conveyer-casings extended through said trunnions and each provided with an inlet and an outlet, spiral conveyers mounted in said conveyer-casings, means for rotating said spiral conveyers, mechanism for rotating the inner perforated drum, and a rotary scraper extended through said drum and its trunnions, substantially as described.

4. In a centrifugal separator, the combination of an outer stationary casing, having a depressed lower bottom and a valved pipe connected therewith, a rotary perforated drum provided with tubular trunnions and arranged in an inclined position within said outer casing, inclined cylindrical conveyer-casings extended through the tubular trunnions of the drum and supported independently thereof, spiral conveyers in said casings, a rotary scraper extended in an inclined position through the drum and its tubular trunnions, and means for adjusting said scraper toward and from the perforated wall of the drum, substantially as described.

5. In a centrifugal separator, the combination of an outer stationary casing, an inner perforated drum provided with tubular trunnions, friction-disks on said trunnions, power-driven friction-disks to bear against the friction-disks of the drum to rotate the same, cylindrical conveyer-casings extended into the drum through its tubular trunnions and each provided with an inlet and an outlet, spiral conveyers mounted in said conveyer-casings, means for rotating said conveyers, a rotary scraper extended through an upper part of the drum and its tubular trunnions, means for adjusting said scraper toward and from the perforated wall of the drum, and perforated cleansing-pipes inserted, respectively, into said drum and into its outer casing at one end of each, substantially as described.

6. In a centrifugal separator, an outer casing, a perforated drum arranged therein, a filtering material interposed between the walls of said drum, means for imparting a rotary movement to said drum, a suitably arranged conveyer adapted to supply material to said drum, a suitably-arranged conveyer adapted to discharge material from said drum, a rotary scraper arranged in the said drum, means for adjusting the position of said scraper, means for imparting a rotary movement to said scraper, and a perforated cleansing-pipe arranged in the said drum and casing.

In testimony whereof I have hereunto set my hand in presence of two subscribing witnesses.

WALTER H. COOK.

Witnesses:
PORTER PARKER,
LAURENCE JANIN.